United States Patent [19]

Yamamoto

[11] Patent Number: 4,638,671
[45] Date of Patent: Jan. 27, 1987

[54] CHECKER FOR AIR CONDITIONER

[75] Inventor: Yoshinori Yamamoto, Urayashu, Japan

[73] Assignee: Daikyo Service Station Development Co. Ltd., Japan

[21] Appl. No.: 738,011

[22] Filed: May 24, 1985

[30] Foreign Application Priority Data

Jun. 1, 1984 [JP] Japan ............................ 59-80446[U]

[51] Int. Cl.⁴ ............................................ G01L 19/04
[52] U.S. Cl. ...................................... 73/708; 73/714; 374/143
[58] Field of Search ...................... 73/714, 170 R, 708, 73/431; 374/143; 116/DIG. 37

[56] References Cited

U.S. PATENT DOCUMENTS 2,239,221 4/1941 Dimmock ........................... 374/143

Primary Examiner—Donald O. Woodiel
Attorney, Agent, or Firm—McGlew and Tuttle

[57] ABSTRACT

A checker for air conditioner with a pressure gauge, which comprises an auxiliary dial plate placed on the pressure gauge panel rotatable coaxially therewith. The auxiliary dial plate has an indicator zone and a temperature correction graduation arranged in such a manner, that the existing stand of charge of the coolant is indicated by the pressure gauge needle directly on the indicator zone, when the ambient temperature is set on the temperature correction graduation at a reference mark disposed on the gauge panel adjacent the temperature correction graduation.

2 Claims, 2 Drawing Figures

CHECKER FOR AIR CONDITIONER

BACKGROUND OF THE INVENTION

1. Field of the Invention

The present invention relates to a checker for air conditioner which consists in that a pressure gauge for checking the existing level of charge of the coolant gas, such as, for an air conditioner, car cooler or so on, is provided with an auxiliary dial plate on the gauge panel, by which it is permissible to judge at a glance whether additional charge of the gas is necessary or not.

2. Description of the Prior Art

Hertofore, an inspection of the existing level of charge of the coolant in an air conditioner etc. was carried out in such a manner, that a hose attached to the air conditioner etc. is connected to the pressure gauge is order to check the pressure of the coolant in the hose, whereupon the correction value corresponding to each particular temperature at the inspection was read from a reference table to calculate the existing charge level.

As the coolant, so-called freon gases are used in general. Freon gases offer a quite large temperature-discrepancy between the detected pressure and the "charge" pressure. Therefore, it has heretofore been possible to judge whether the existing charge level of the coolant fell in a tolerable or suitable range or not, only when a confirmation on the reference table was incorporated.

BRIEF SUMMARY OF THE INVENTION

The object of the present invention is to remove the above difficulty and to provide a simple means for checking the existing level of charge, of the coolant, by the aid of a specially designed auxiliary dial plate placed on the gauge panel of the pressure gauge coaxially therewith in rotatable manner, so as to allow the present stand of charge of the coolant on said auxiliary dial plate to be read directly.

Thus, the present invention proposes a novel checker for air conditioners with a pressure gauge, comprizing an auxiliary dial plate placed on the pressure gauge panel rotatably coaxially therewith, said auxiliary dial plate having arranged thereon an indicator zone and a temperature correction graduation, in such a manner, that the existing charge level of the coolant is indicated on the indicator zone directly by the pressure gauge needle, when the ambient temperature is set on said temperature correction graduation at a reference mark disposed on the gauge panel adjacent said temperature correction graduation.

DETAILED DESCRIPTION OF THE INVENTION

According to the present invention, there are arranged on the auxiliary dial plate an indicator zone having at least one indication range, on the one hand, and a temperature correction graduation, on the other hand, in such a manner, that by setting the ambient temperature on said correction graduation at a reference mark disposed on the pressure gauge panel the existing charge level of the coolant is indicated on said indicator zone by the gauge needle.

The auxiliary dial plate may have a form of circular disc with a diameter a little smaller than the gauge panel and thereon is arranged the indicator zone along the circumference of the disc over a part thereof. The temperature correction graduation having graduation lines corresponding to the ambient temperatures is disposed also over a part of the circumference of the dial disc. The reference mark, at which the graduation line corresponding to the ambient temperature is to be set, is disposed on the gauge panel adjacent the correction graduation of the auxiliary dial disc. When the ambient temperature which may conveniently be read on a thermometer arranged aside the pressure gauge is set on the temperature correction graduation at the reference mark disposed on the gauge panel, the pressure gauge needle will point an indication range on the indicator zone of the auxiliary dial disc. The indication range may carry a literal indication, such as, "Gas charge required", "No charge required", "Suitable" or the like, designating thus the existing stand of charge of the coolant.

It is said that the suitable pressure for the "charge" pressure for each temperature lies at 9 $Kg/cm^2$ at 15° C., 11 $kg/cm^2$ at 20° C., 13.5 $Kg/cm^2$ at 25° C. and 16 $Kg/cm^2$ at 30° C., wherein each 2 $Kg/cm^2$ for the upper and lower margins are considered to be tolerated.

Therefore, the indicator zone disposed on the auxiliary dial disc along the circumference thereof may preferably be divided into indication ranges each covering an interval corresponding to a pressure range of 4 $Kg/cm^2$ in accordance with the above tolerable margins.

Figure 1:
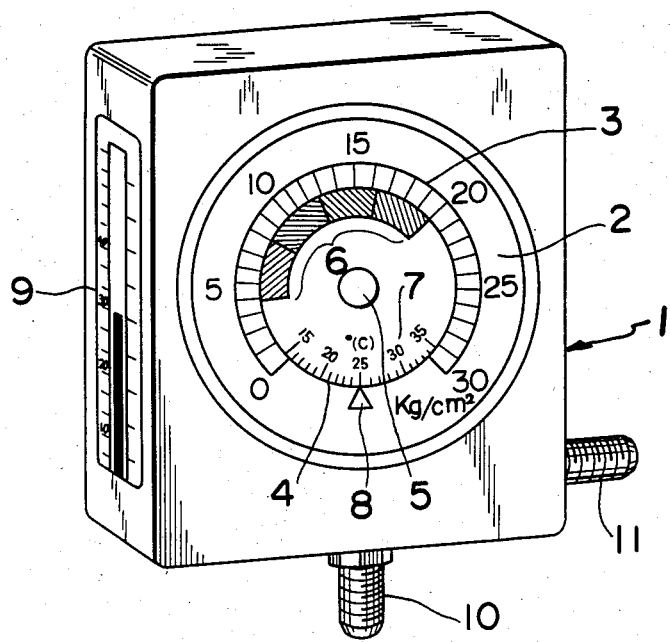
Figure 2:
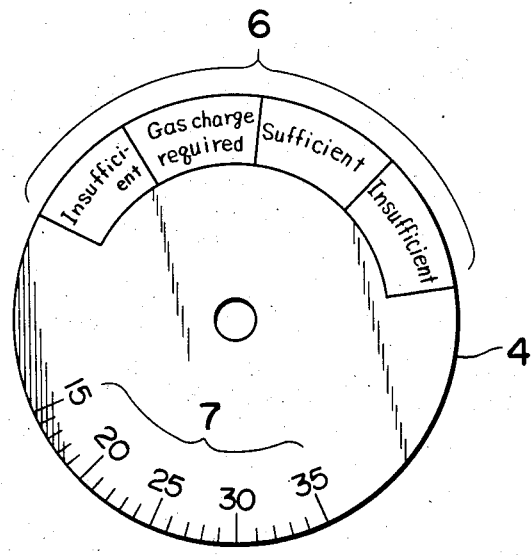

In below, the invention will be described by way of an Example with reference to the appended Drawings showing the checker according to this Example, in which FIG. 1 is a perspective view of the checker and FIG. 2 shows the auziliary dial disc in enlarged detail.

EXAMPLE

As shown in FIG. 1, a gauge panel 2 of a pressure gauge 1 carries an annular gauge graduation 3. An auxiliary dial plate 4 in a form of circular disc having a diameter somewhat smaller than the annular gauge graduation 3 is placed on the gauge panel 2 rotatably and coaxially therewith. The auxiliary dial disc 4 has a finger piece 5 at its center to allow manual rotation thereof relative to the gauge panel 2. The auxiliary dial plate 4 may be composed of a transparent disc having a diameter that covers the annular gauge graduation 3.

The auxiliary dial disc 4 carries an indicator zone 6 consisting of four indication ranges each of which covers an interval of pressure of 4 $Kg/cm^2$ and has a literal designation of, for example, "Insufficient", "Sufficient", "Gas charge required" or "Insufficient" respectively. On the other portion of the dial disc 4, a temperature correction graduation 7 is arranged. A reference mark 8 for use for adjusting the temperature graduation 3 to the ambient temperature detected is disposed on the pressure gauge panel 2 at an adequate position adjacent the graduation 3.

The relative correlation between the indicator zone 6 and the temperature correction graduation 7 on the auxiliary dial disc 4 is such that the indication "Sufficient" of the indicator zone will be pointed by the pressure gauge needle, when the ambient temperature is set on the temperature correction graduation at the reference mark 8.

Moreover, the checker may be provided with a thermometer 9 preferably on one side thereof, as shown in FIG. 1. Numerals 10 and 11 represent the pipe connections for connecting the hose from the air conditioner and for charging the coolant gas respectively.

For operating the checker, the pipe connection 10 is first connected to the gas hose attached on the air conditioner. Then, the auxiliary dial disc 4 is manipulated so as to adjust the graduation line of the temperature correction graduation 7, which corresponds to the ambient temperature detected by the thermometer, to coinside with the reference mark 8. Here, the indication range, to which the pressure gauge needle now points, indicates the existing stand of charge of the coolant gas directly. For instance, when the indication range "Gas charge required" is pointed by the needle, a charging of the coolant gas should be effected through the pipe connection 11 until the needle will point at the indication range "Sufficient". On the other hand, if the indication corresponds to the "Insufficient" on the higher pressure side, an existence of a clogging of flow system is to be presumed, whereas if the indication corresponds to the "Insufficient" on the lower pressure side, either a shortage of the coolant gas or a disorder of the compressor pump should be considered.

Thus, using the checker according to the present invention, it is able to judge at a glance, whether a further charge of coolant gas is required or not.

What is claimed is:

1. A device for checking an air conditioner, the air conditioner including coolant for circulation therein, a coolant charge hose and a coolant pressure hose device comprising;

A pressure gauge having a pressure gauge indicator, movable in a circular path on a circular dial plate which has an annularly extending pressure indicating scale;

A circulator or auxiliary dial plate engagable over the circular dial plate of the pressure gauge and having a temperature correction gradution along its edge on the one side and an indicator zone along its edge on a diametrically opposite side from said graduation with a plurality of gas charge operating conditions indicated thereon, said operating range conditions and said temperature graduation corrections being arranged so that when the ambient temperature indication is aligned with a reference mark the pressure gauge needle will be positioned in an appropriate operating indicating range.

Finger piece means, associated with said auxiliary dial plate and coaxial therewith, for manual rotational manipulation of said auxiliary dial plate and for selecting an appropriate ambient temperature indication on said temperature correction graduation; first hose connection means for connecting the air conditioner coolant pressure hose to said pressure gauge; and, second hose connection means for connecting the air conditioner coolant charge hose to said device and for effecting a charging of the coolant gas when said pressure gauge needle is positioned in an inappropriate operating indicating range.

2. A device according to claim 1, including a pressure gauge housing of rectangular configuration having a front face with an annular dial overlying a pressure gauge needle indicator and having and end face with a thermometer thereon, said circular annular dial being transparent.

* * * * *